United States Patent [19]

de Ridder

[11] 4,422,510

[45] Dec. 27, 1983

[54] APPARATUS FOR THE PROVISION OF VETICAL DRAIN CHANNELS IN GRASS, FIELDS, MEADOWS ETC.

[75] Inventor: Arie-Jan de Ridder, Soesterberg, Netherlands

[73] Assignee: Redexim Holding S.A., Bulle, Switzerland

[21] Appl. No.: 241,211

[22] Filed: Mar. 6, 1981

[30] Foreign Application Priority Data

Mar. 10, 1980 [NL] Netherlands .......................... 8001412

[51] Int. Cl.³ ............................................ A01B 45/02
[52] U.S. Cl. .................................................... 172/21
[58] Field of Search ............................. 172/21, 22, 264

[56] References Cited

U.S. PATENT DOCUMENTS

| | | | |
|---|---|---|---|
| 672,572 | 4/1901 | Schley | 172/264 |
| 2,056,337 | 10/1936 | Archibald | 172/21 |
| 2,347,748 | 5/1944 | Melling | 172/21 |
| 2,789,522 | 4/1957 | Barton | 172/21 X |
| 3,204,703 | 9/1965 | Hansen | 172/21 |
| 3,528,505 | 9/1970 | Bushmeyer et al. | 172/264 |

FOREIGN PATENT DOCUMENTS 661287 11/1951 United Kingdom ................. 172/21

Primary Examiner—Paul E. Shapiro
Attorney, Agent, or Firm—Murray Schaffer

[57] ABSTRACT

A frame is provided journalling a rotary shaft having a lever system for rectilinearly driving at least one set of pins into and out of the ground. The lever system has a pair of substantially parallel spaced rods connected pivotally at one end to the set of pins and at the other end pivotally to the frame and offset from each other. The lower rod is extendible in length when the pins are placed under load and automatically resumes its normal length when the load is removed.

4 Claims, 4 Drawing Figures

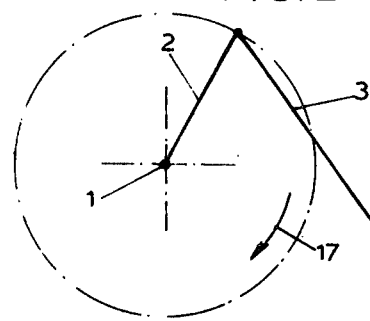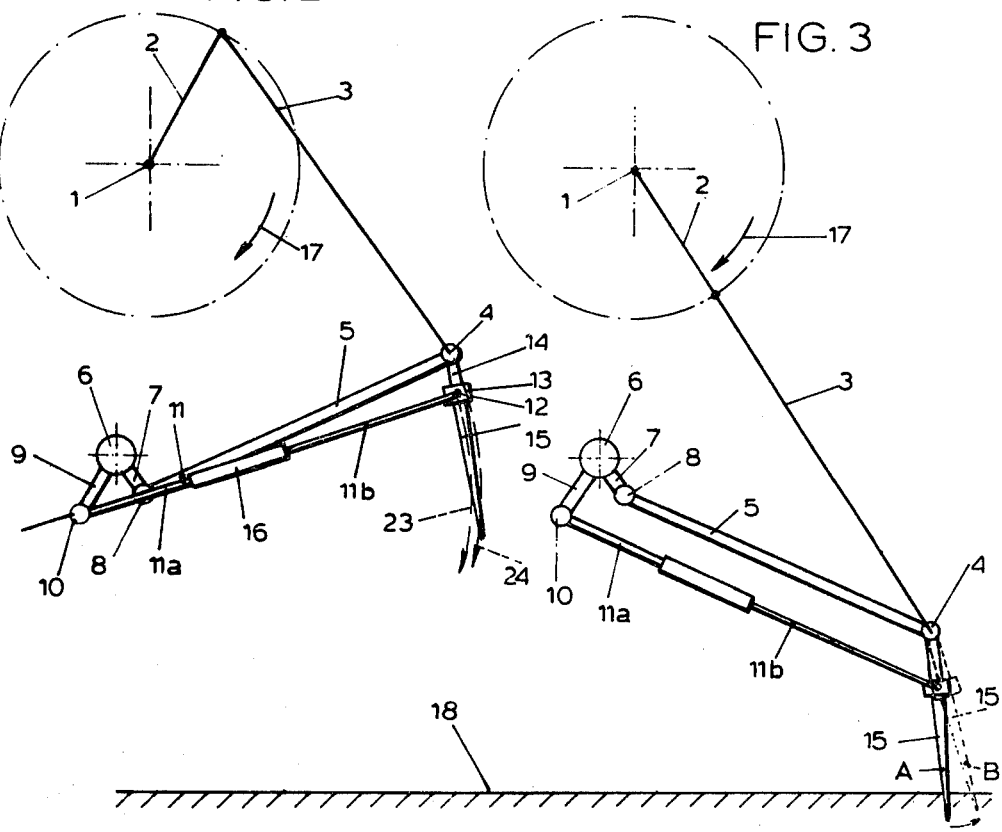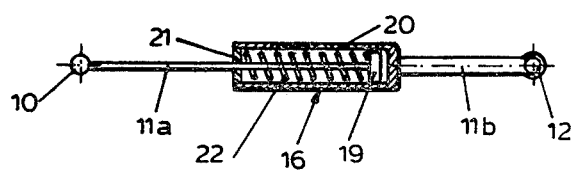

APPARATUS FOR THE PROVISION OF VETICAL DRAIN CHANNELS IN GRASS, FIELDS, MEADOWS ETC.

BACKGROUND OF THE INVENTION

The invention relates to an apparatus for the provision of substantially vertical drain channels in the ground such as in grass fields, meadows etc., comprising sets of pin-shaped elements, driven by means of a rotatable shaft, journalled in the frame of the apparatus, the sets of pin-shaped elements being provided mutually adjacent in the longitudinal direction of the shaft.

Apparatus are known wherein the pin-shaped elements are provided radially on a rotor. If there is a predetermined ratio between the propagation velocity of the apparatus, which is usually mounted to a tractor, and the rotor velocity the pins penetrate substantially vertically into the soil and also leave the soil thereafter substantially vertically. The pins, however pivot through a small angle during their contact with the soil whereby at least the end of the hole made that is adjacent to the soil surface becomes somewhat slit-shaped and the wall of the hole is locally compacted or compressed. Moreover, the turf or grass surface is damaged which in many cases as for example for sports fields is not allowable. This phenomena increases in proportion to the increase in the penetration depth of the pins. The result of these features is that an insufficient amount of rain water may be stored in the soil so that the field becomes soggy with heavy rainfall. It is due to the compression of the hole wall, that water is not permitted to reach the soil below the turf and the temporary water storage space (prior to sinking downwardly into the soil, which requires some time) is sufficient due to the shallow holes.

The invention aims at removing the above mentioned disadvantages and providing an apparatus for draining sports fields etc., which results in a much larger discharge possibility for water without appreciable damage to the turf.

This is achieved according to the invention in that each pin-shaped element, including one or more pins, is pivotably connected at its end remote from its penetrating end to one end of a first rod, which is pivotably secured at its other end to the frame of the apparatus, while a second rod, extending substantially parallel to the first rod, is connected pivotably at one end to the pin-shaped element below the pivot point of the first rod and is connected likewise pivotably at its other end to the frame of the apparatus. A spring biassed section is provided in the second rod whereby the rod may increase in length when the pin or pins are loaded but resume its original length under the influence of the spring force when the load is removed.

Preferably the driving movement of the pin-shaped elements is achieved in that the end thereof is connected to a connecting rod of a crank mechanism driven by the rotary shaft. Alternatively the pin-shaped elements may be driven in different manner, e.g. through pneumatic or hydraulic piston-cylinder units actuated through valves which are switched by cams provided on the rotary shaft when this shaft is rotated. However, the preferred embodiment is cheaper.

Due to the reciprocating movement of the connecting rod or piston drive, the movement of the pins takes place substantially vertically in the driving-in direction into the soil, contrary to a tangential movement when they are rotary driven directly by the shaft. When the pins penetrate into the soil, the crank is substantially in its lower dead centre so that the pivot point of the pins does not move in any substantially tangential direction. At the moment in which the pin tends to leave the soil, the tangential velocity component increases but due to the spring biassed portion in the second rod, the pin pivots around its lower point, whereby the hole made is much enlarged at its lower end without appreciable widening of the upper end. The result is that the hole becomes larger than with the known apparatus so that it may contain much more water while the looser lower soil material is crumbled by the pivotal movement and no compressed walls are obtained so that the whole wall is porous and permits a quicker passing of the water as has been found by experiment.

In order to permit the resilient yielding of the pin-shaped elements, the second rod in a preferred embodiment comprises two parts namely a sleeve and a rod slidably inserted into the sleeve, each having an abutment. A compression spring is provided around the rod within the sleeve in engagement with the abutments.

When failure occurs of a pin, e.g. when it hits a stone in the soil or with advanced wear of a pin, it is easily replaceable according to the invention by mounting each pin of a pin-shaped element in a releasably connected block at its end remote from the penetrating end. The block carrys the pivot point of the second rod.

The invention will hereunder be further illustrated with reference to the drawing in which an example of an embodiment of the apparatus according to the invention is shown.

BRIEF DESCRIPTION OF THE DRAWINGS

In the drawings:

FIG. 2 is a side elevation of one pin-shaped element in the position above the soil.

FIG. 3 is a side view of the element according to FIG. 2 in the position in which the pin or pins have penetrated into the soil.

FIG. 4 shows a section of the spring device in the second rod.

DESCRIPTION OF THE INVENTION

Figure 1:
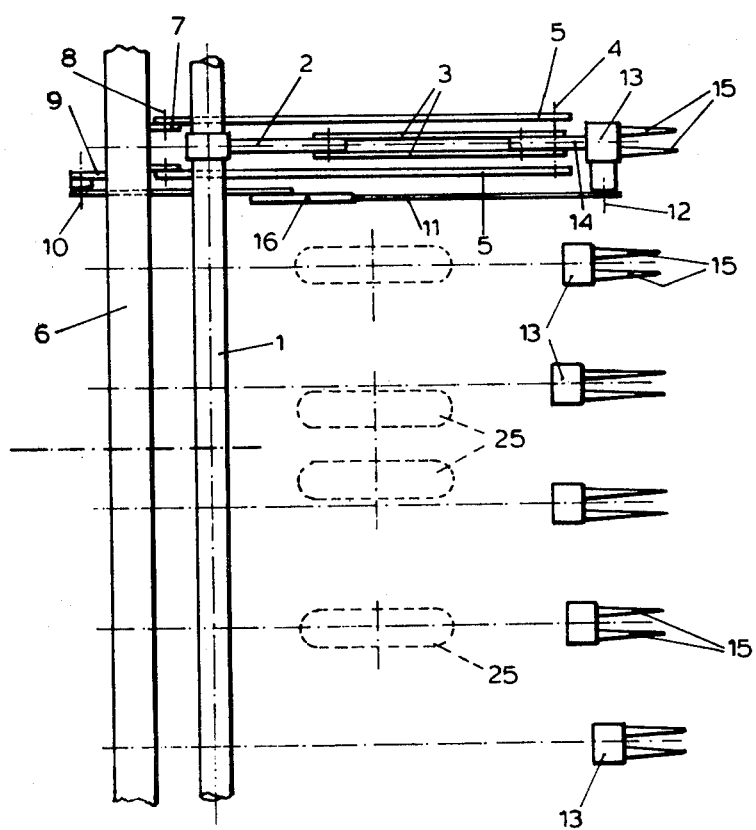
FIG. 1 is a schematic plan view of the apparatus.

As seen in FIG. 1 a rotary crank shaft 1 has mounted thereon a plurality of cranks 2, (in the embodiment only six cranks with only one of the cranks has been shown in detail). The complete apparatus as shown in FIG. 1 may be suspended by a frame to a three-point-support of a tractor, the output shaft of the tractor being adapted to be coupled to rotate the crank shaft 1. Each crank 2 is pivotably connected to a connecting rod 3 consisting of two rods in the embodiment shown. The end of the connecting rod 3 remote from the crank 2 is connected through a pivot 4 to a first rod 5, which, in the embodiment shown, likewise comprises two rods extending at both sides of the connecting rod 3.

Furthermore a shaft or tube 6 is to the frame of the apparatus and two fixed projections 7 and 9 extend downwardly from tube 6. The projection 7 is connected at its free end by a pivot 8 with the end of the rod 5 remote from the pivot 4. The other projection 9 carries at its free end a pivot 10 connected to one end of a second rod 11 the front end of which is connected through a pivot 12 to a block 13. An upward extension 14 of this block has at its upper end a pivot connection to the pivot 4. The block 13 carries from its lower end the pin-shaped element, comprising in the embodiment shown two pointed pins 15 arranged parallel and adjacent to each other.

A spring device 16 is incorporated in the second rod 11, said device being shown in detail in FIG. 4.

If the rotary crank shaft 1 is driven in the direction of the arrow 17 as shown in FIGS. 2 and 3 the rods and the pins 15 perform a reciprocating movement substantially between the positions according to FIG. 2 and FIG. 3. In the position of FIG. 3 the pins 15 have penetrated into the soil 18 and if the crank shaft is then moved beyond the position substantially as shown in FIG. 3, the pins 15 yield from the position A, shown in full lines in FIG. 3, to the position B shown with broken lines. This is permitted by the yielding of the both parts 11$a$ and 11$b$ of the rod 11 against spring pressure. Thereby the pins pivot substantially around the pivot point 4. A widening is thus achieved of the hole made in the soil in that portion of the vertical channel farthest from the soil surface 18. Simultaneously the soil behind the pins and adjacent the surface, usually a turf or grass coverage, is lifted somewhat during the rearward movement of the pins 15, so that a certain vibration of the soil occurs at that location which contributes to making the soil porous.

FIG. 4 illustrates the rod 11 as comprising a rodpart 11$a$ carrying at one end the pivot 10 and an abutment 19 at the other end. The otherpart 11$b$ carries at the right end the pivot 12 and at the left end a sleeve 20 which in its turn has at its left end an abutment 21 shaped as an endwall of the sleeve. The sleeve has an aperture through which the rod part 11$a$ projects.

A compression spring 22 has been provided between both abutments 19 and 21 in the sleeve 20. When the apparatus is operative, during which not only the pins move acurately along the arcs 23 and 24 of the pivot points 4 and 12, as shown with broken lines, upwardly and downwardly, but also the complete apparatus moves forwardly due to the travelling movement of the tractor, (in FIGS. 2 and 3 to the left). In the position A of the FIG. 3 the pins may now yield due to the resistance experienced from the soil 18, against the pressure of the spring 22 to the position B.

The angle, whereby the pins 15 enter the soil may be adjusted by providing the sleeve shaped end with interior screwthread, receiving the connecting end rod 11 which is provided with an exterior screwthread. This structure, which is known per se, has not been shown.

It will be clear that the pins 15 may have arbitrary shapes, e.g. may have instead of the straight shape as shown also a somewhat curved shape. Moreover, they may have different widths in the direction perpendicular to the plane of the drawing.

It appears from FIG. 3 that when the pins enter the soil, the rods 5 and 11 with the parts 7, 9 on the one hand and 14 on the other hand substantially constitute a parallelogram, having rectilenear movement so that the pins carry out substantially a translatory movement responsive to the movement of the connecting rod-crank-mechanism. This contributes to minimal widening of the hole made at the surface of the turf and therefore to as little damage of said turf as possible and as little compression of the hole wall as is possible. The pins 15 penetrate into the soil substantially along a straight line, but pivot rearwardly around the pivots 4 as permitted by the resilient portion 16 in the second rod 11. Thereby the hole made is widened at its lower end for better water storing capacity while at the same time the soil is crumbled and the hole wall made porous for better water permeability. During the pivotal movement of the pins they remain substantially stationary at the location of the soil surface or turf, so that no damage of the surf is produced. Upon withdrawal of the pins from the group or removal of any load thereon, the rod will automatically resume its normal length.

The apparatus may be provided with more or fewer sets of pin shaped elements 15 in the longitudinal direction of the crank shaft 1 and thereby is adapted to selecting a larger or smaller spacing between the pin shaped elements dependent on the desired purpose or the use of the apparatus. The spacing of the channels in the soil in the propulsion direction may be somewhat adjusted by varying the ratio between the propulsion velocity of the tractor and the velocity of rotation of the crankshaft 1.

The apparatus may further be provided with running wheels 25, four wheels being shown with broken lines in FIG. 1. During the operation of the apparatus, said wheels are supported by the soil 18 and serve to relieve the stress on the three-point-support of the tractor. When the apparatus is not operative, the frame may be lifted, so that the wheels 5 are situated above the soil.

I claim:

1. Apparatus for providing substantially vertical drain channels in the ground such as in an open field, turf, meadow or the like, comprising a frame adapted to move along the ground having a rotary shaft journalled therein and one or more sets of pins adapted to penetrate the ground, at least one set of pins being connected to a lever system driven by said rotary shaft for reciprocal vertical movement, said lever system comprising a pair substantially parallel spaced rods connected at one end pivotally to the associated pins one below the other and at their other ends pivotally to said frame offset from each other, said lower one of said rods having resilient means for extending its length when said pins are placed under a load and for automaticly resuming its normal length when said load is removed.

2. The apparatus according to claim 1 wherein said lower rod includes as a section thereof a sleeve, and a rod member slidably extending into said sleeve, said rod member having an abutment at the end thereof and said sleeve having an abutment at the end thereof opposite the abutting on said rod member, and a compression spring located about said rod member within said sleeve and abutting against each of said abutments.

3. The apparatus according to claim 2 wherein each set of pins comprises a block in which one or more pins are releasably secured, said block comprising the pivot point for the lower aim.

4. The apparatus according to claim 2 including a crank secured at one end to said rotary shaft, and an arm pivotally connected to the end of said crank and to said set of pins at the pivot joint between said pins and the upper rod whereby said pins are driven.

* * * * *